C. M. FULLER.
TRACTION BELT TRACTOR.
APPLICATION FILED MAY 10, 1919.
1,330,253. Patented Feb. 10, 1920.
2 SHEETS—SHEET 2.
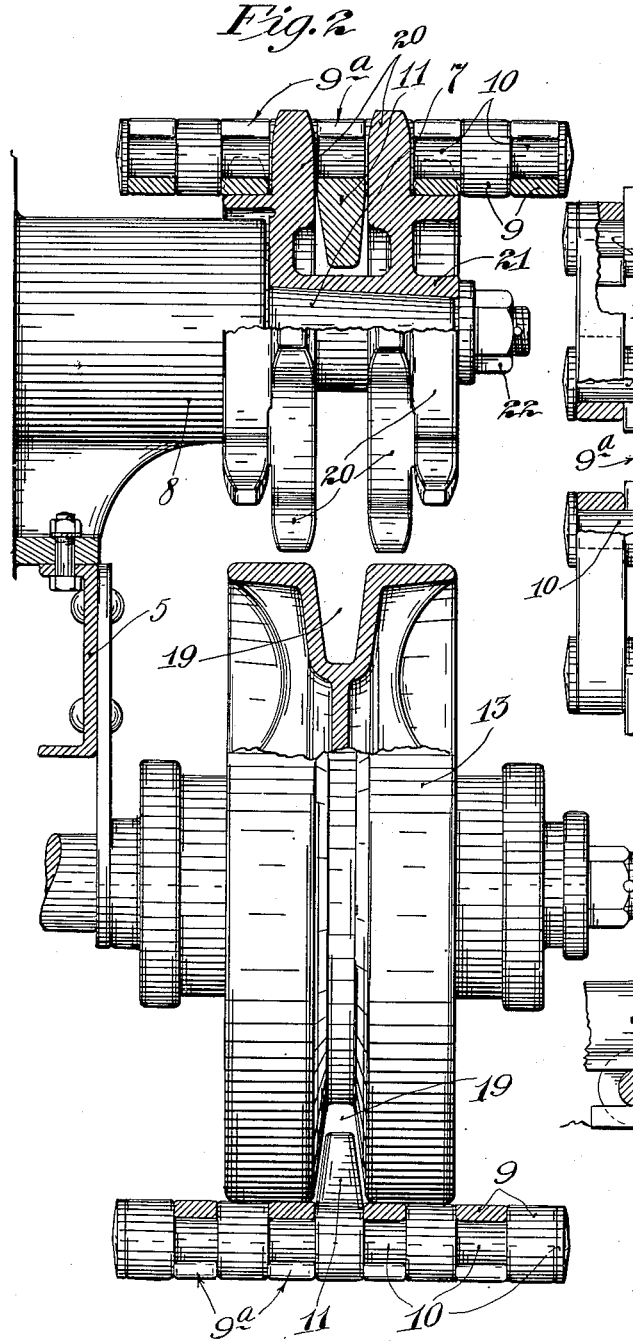
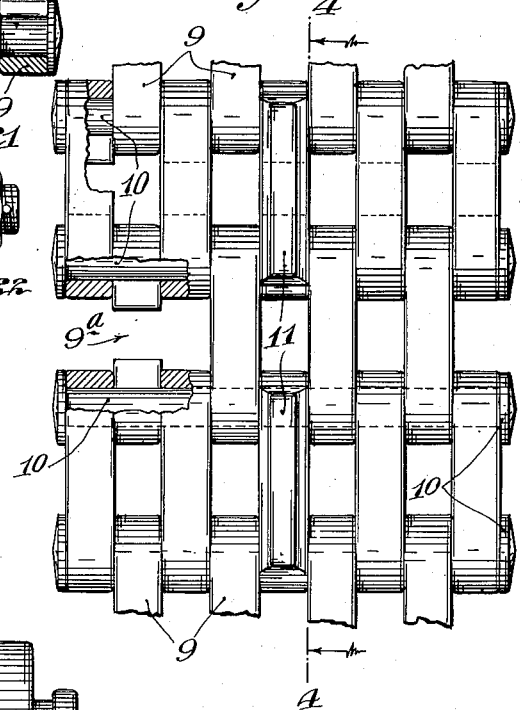
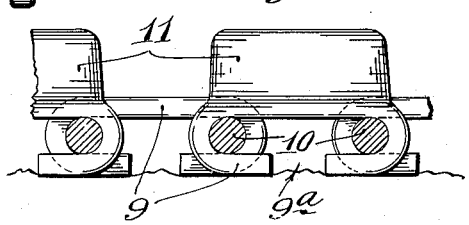
Inventor
Charles M. Fuller
By his Attorneys
Williamson Merchant

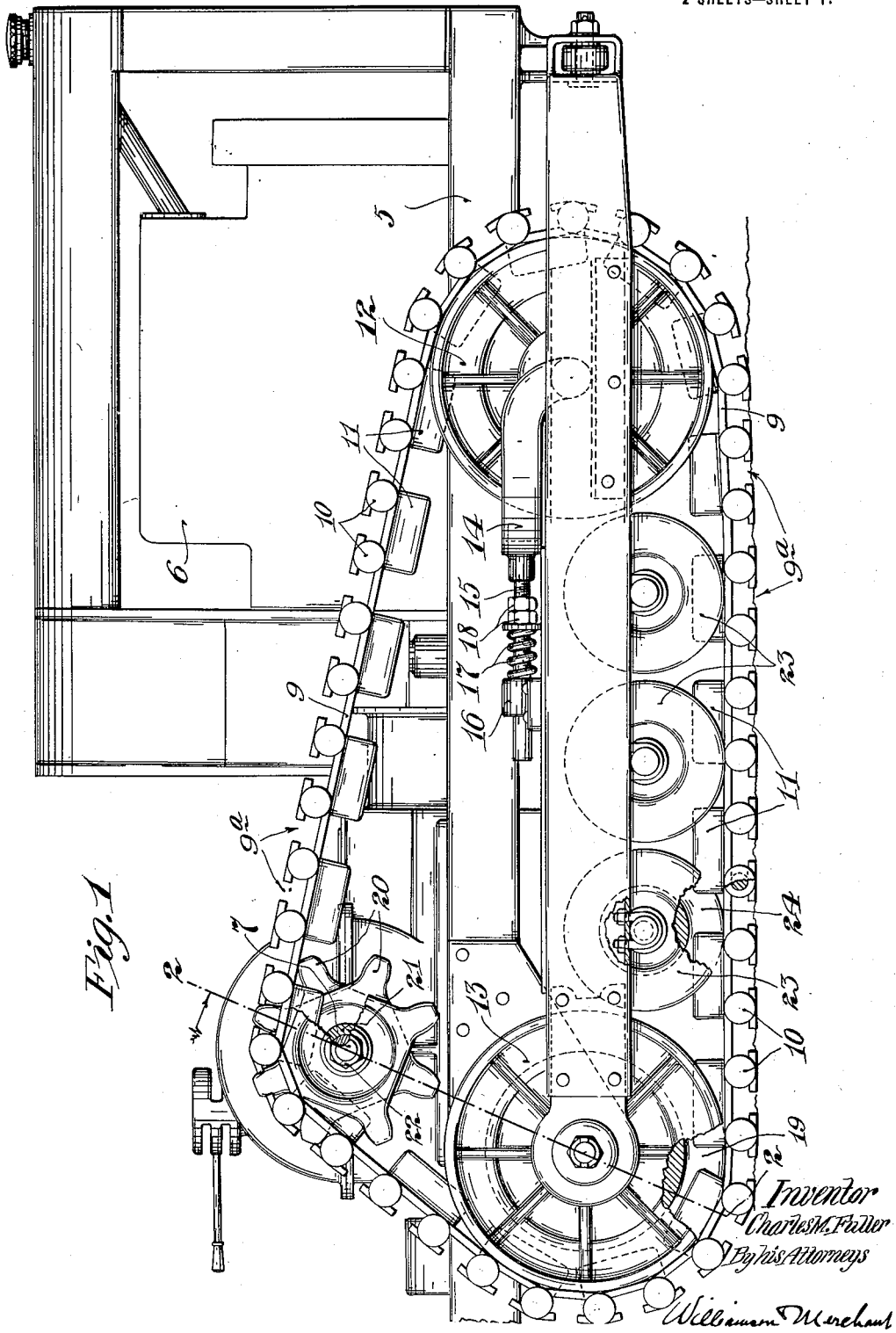

UNITED STATES PATENT OFFICE.

CHARLES M. FULLER, OF HAWTHORNE, CALIFORNIA, ASSIGNOR TO HENRY R. COUSINS, OF HANFORD, CALIFORNIA.

TRACTION-BELT TRACTOR.

1,330,253.      Specification of Letters Patent.      Patented Feb. 10, 1920.

Application filed May 10, 1919. Serial No. 296,077.

*To all whom it may concern:*

Be it known that I, CHARLES M. FULLER, a citizen of the United States, residing at Hawthorne, in the county of Los Angeles and State of California, have invented certain new and useful Improvements in Traction-Belt Tractors; and I do hereby declare the following to be a full, clear, and exact description of the invention, such as will enable others skilled in the art to which it appertains to make and use the same.

This invention relates to traction belt tractors, that is, that type of tractor wherein the traction is afforded by belts of the link type arranged to run over a suitable guiding and driving wheel. Particularly, the invention is directed to the improvement of the traction belt, *per se*, but the invention also involves novel combinations therewith of guiding and driving wheels of special design, whereby highly improved results are attained. Generally stated, the invention consists of the novel devices and combinations of devices hereinafter described and defined in the claims.

The improved traction belt is made up of links and interlocking coupling pins adapted to be cheaply made and quickly assembled, and which, when assembled, will be held interlocked by the normally operative tension on the belt.

In the accompanying drawings which illustrate the invention in its prefered arrangement, like characters indicate like parts throughout the several views.

Referring to the drawings:—

Figure 1 is a side elevation showing the invention incorporated in a tractor of the type stated;

Fig. 2 is an enlarged transverse section taken approximately on the line 2—2 of Fig. 1, some parts being broken away and some parts being shown in full;

Fig. 3 is a plan view of a portion of the traction belt; and

Fig. 4 is a section on the line 4—4 of Fig. 3.

This improved traction chain is adapted for application to various differently designed tractors of the general type, wherein traction belts are employed, but in the drawings, is shown as applied to a tractor of the type disclosed in my companion application filed of even date herewith, and entitled "Transmission mechanism for tractors."

Of the parts of the tractor illustrated, the numeral 5 indicates the main frame, as an entirety, and the numeral 6 the engine affording the power for driving the tractor. The traction belts, of course, are located, one on each side of the machine, and means is provided for independently or simultaneously driving the two traction belts.

For the purpose of this case, it is only necessary that the driving sprockets for the two traction belts are mounted on the outer ends of the sections of a divided jack shaft 7, mounted in suitable bearings 8 on the main frame 5. The two sections of this shaft 7 may be assumed to be driven through the transmission mechanism disclosed and claimed in my said companion application, although they may be otherwise driven, so far as this invention is concerned.

The improved traction belt is made up of a multiplicity of laterally and circumferentially spaced links 9 and coupling pins 10. The links 9 are preferably formed from flat steel bars cut to the desired lengths and bent in a bull-dozer or other suitable means with the links formed with open gaps $9^a$. Links thus formed, may be very cheaply made, and, moreover, the gaps $9^a$, when set in contact with the ground are highly important because they increase the traction of the belt and make unnecessary, special provision for traction lugs. The coupling pins 10 are headed at both ends, preferably by upsetting, so that when the links and pins are assembled, they will be held interlocked by the normal working tension on the belt, that is, by the position in which the belt is held by its guiding and driving wheels. These elements, as is evident, may be very quickly assembled. Here it should be noted (see particularly Fig. 4) that the gaps $9^a$ of the links 9 are wide enough to permit the pins 10 to be passed laterally therethrough to and from operative positions. When assembled, as best shown in Fig. 3, the links of adjacent rows will be staggered, leaving gaps for the teeth of driving sprockets. The central row of links 9 is provided with projecting alining webs 11, the purpose of which will presently appear. These central links 9 and 11 may be commercially made either as drop forges or castings.

The tread chains are arranged to run over large front and rear wheels 12 and 13, respectively, the former being, as shown, journaled in suitable bearings on longitudinally adjustable bearing forks 14, mounted for longitudinal adjustments on the main frame to maintain the proper slack tension on the belt. To provide for this adjustment, the fork 14 is shown as provided with a threaded stem 15 working through a bearing 16 on the framework 5. A coiled spring 17 compressed between the bearing 16 and adjusting nuts 18 on the stem 15 yieldingly force the fork 14 and front wheel 13 forward.

The wheels 12 and 13 have smooth faces over which the links of the traction belt run, and they are formed with peripheral transversely central alining channels 19 in which the alining webs 11 of the tread belt run to positively hold the belt transversely centered on the said wheels.

For driving its tread belt, I provide a double sprocket 20 made up of two sections secured to a common sleeve 21; and each section or transversely separated part of said sprocket is provided with two rows of driving teeth staggered in respect to each other, so as to properly aline with the staggered ends of adjacent links. By reference, particularly, to Fig. 1, it will be noted, that by the above arrangement of the sprocket teeth of the double sprocket, there will always be six sprocket teeth engaged with six links, which, of course, distributes the driving strain and the wear. The alining webs 11 of the belt run between the two sections of the driving sprocket 20. Thus clearance for the said webs is provided, and, moreover, the said webs assist the sprocket teeth in holding the traction belt against lateral movements.

By reference to Fig. 2, it will be noted that, preferably, the projecting ends of the divided driving shaft 7 are tapered and that the hub or sleeve of the sprocket is entirely tapered to fit the same. A nut 22 on the threaded ends of shaft 7 securely clamp the sprockets on the tapered ends of said shaft, but preferably the sprockets will be further secured to the shaft sections by keys, pins, or other suitable devices.

Between the front and rear main wheels 12 and 13, the traction belt runs under and in engagement with smaller intermediate bearing wheels 23 that are also suitably journaled to the framework. These bearing wheels 23, like the main wheels, are formed with peripheral alining channels 24 through which the alining webs 11 of the belt are arranged to pass. It is also important to note (see Fig. 1), that the webs 11 are of such length, in respect to the distance between the wheels 12, 23 and 13, that the alining web 11 will pass into the channel of the next adjacent wheel before it leaves the channel of the last adjacent wheel. This positively prevents the tread chain from getting out of alinement while engaged with the ground, even when the machine is being turned and there is very considerable lateral thrust put upon the belt. Hitherto, some difficulty has been experienced in preventing traction belts from running off from their guiding wheels when turning curves and when running on side hills.

As already indicated in a general way, the gaps $9^a$ in the links 9 give the belts all of the traction that is required. Obviously, under the weight of the load on the links that are engaged with the ground, the links will be pressed into the ground and the dirt will be pressed into the gaps $9^a$, or, in other words, the lower end portions of the links will be pressed into the ground so as to act as traction lugs. As there are a very large number of these links, the aggregate tractive action thereof is very large, and, moreover, this traction belt, when running on hard smooth roads, will not damage the same in any way. Moreover, in this arrangement of belt and sprockets, it is impossible for the belt to become, what is known as "Track bound," that is, so covered with dirt on its undersurface that the belt, when running over its guide wheels will be stretched and put under such tension that the driving power of the tractor is nearly or quite destroyed. In the above described arrangement, the belt, itself, has such a large number of openings that the dirt will work out therethrough, and moreover, the teeth of the sprockets keep the openings between the links clear of accumulated dirt.

In tractions of this character, nearly all of the wear is generally taken on one end of a particular link, and on one side of the teeth of a particular sprocket, because the driving action in picking up is so seldom used that the wear incident thereto, is nearly negligible. With the belt described, after the wear on one end of the links has become considerable, the belt can be taken off and shifted, end for end, so as to shift the wear to the opposite ends of the links. Moreover, after both ends of the links that engage with the sprocket teeth under the first adjustment of the links is too great, the links of the belt may be reassembled so as to shift links that, in the first adjustment were between the sprocket teeth, to positions in alinement with the sprocket teeth. In this way, with a single chain, the sprocket-engaging surface may be adjusted four times, thus giving a very long life to the belt.

In the driving action, with the sprocket in the first adjustment, or first position on one section of the shaft 7, the wear will all come on one side of each sprocket tooth; but by shifting the right hand sprocket to the left and the left hand sprocket to the right hand section of the shaft 7, different faces of the sprockets may be presented to the links and thus the life of the sprockets may be doubled.

Thus, it is evident that, by my invention, I provide at a relatively low first cost, a traction belt and coöperating devices having a maximum tractive efficiency and long life or wearing qualities. Attention may also be called to the fact that the tread belt described has sufficient flexibility to adapt itself to irregularities in the ground.

What I claim is:

1. A traction belt for tractors made up of a plurality of laterally spaced links and coupling pins connecting the links, the said links having normally open gaps of sufficient width to permit said pins to be moved laterally therethrough.

2. A traction belt for tractors made up of a plurality of laterally spaced links and coupling pins connecting the links, the said links having normally open gaps of sufficient width to permit said pins to be moved laterally therethrough, and the said pins having headed ends holding the same against axial movements in the assembled belt.

3. A tread belt for tractors made up of a plurality of laterally spaced longitudinal series of links and coupling pins connecting said links, in combination with guiding and driving wheels, the said belt being applied to run over said wheels and having on their outer or ground-engaging faces, open gaps exposed for direct action on the ground to increase the tractive action of the belt.

4. A traction belt for tractors made up of a plurality of laterally spaced open side links and coupling pins connecting the links, the said pins having heads at their outer ends, and certain of the transversely intermediate links having alining flanges, said belt forming elements being held interlocked by the normal operative tension on the belt.

5. A tread belt for tractors made up of a plurality of laterally spaced longitudinal series of open side links and coupling pins connecting the links, the said pins having heads at their outer ends, and certain of the transversely intermediate links having alining flanges, in combination with guide wheels and a driving sprocket for said tread chain, said guide wheels having peripheral alining channels and said driving sprocket comprising toothed members spaced to permit the alining flanges of said belt to pass between the same.

6. A tread belt for tractors made up of a plurality of laterally spaced longitudinal series of open side links and coupling pins interlocked to and pivotally connecting said links, certain of the intermediate links having alining flanges, in combination with a driving sprocket, front and rear wheels and bearing wheels intermediate of said front and rear wheels, said belt running in contact with said sprocket chain and wheels and all thereof having channels through which the alining webs of said links are arranged to run.

7. A tread belt for tractors made up of a plurality of laterally spaced longitudinal series of open side links and coupling pins interlocked to and pivotally connecting said links, certain of the intermediate links having alining flanges, in combination with a driving sprocket, front and rear wheels and bearing wheels intermediate of said front and rear wheels, said belt running in contact with said sprocket chain and wheels and all thereof having channels through which the alining webs of said links are arranged to run, the said alining flanges being of such length that they will span the space between said bearing wheels and between the front and rear bearing wheels and the front and rear main guiding wheels.

In testimony whereof I affix my signature in presence of two witnesses.

CHARLES M. FULLER.

Witnesses:
 BERNICE G. BAUMANN,
 HARRY D. KILGORE.